Inventors:
Russell R. Raney
Victor J. Komuchar
John E. Lammie
Robert E. Evans

Paul O. Pippel Atty.

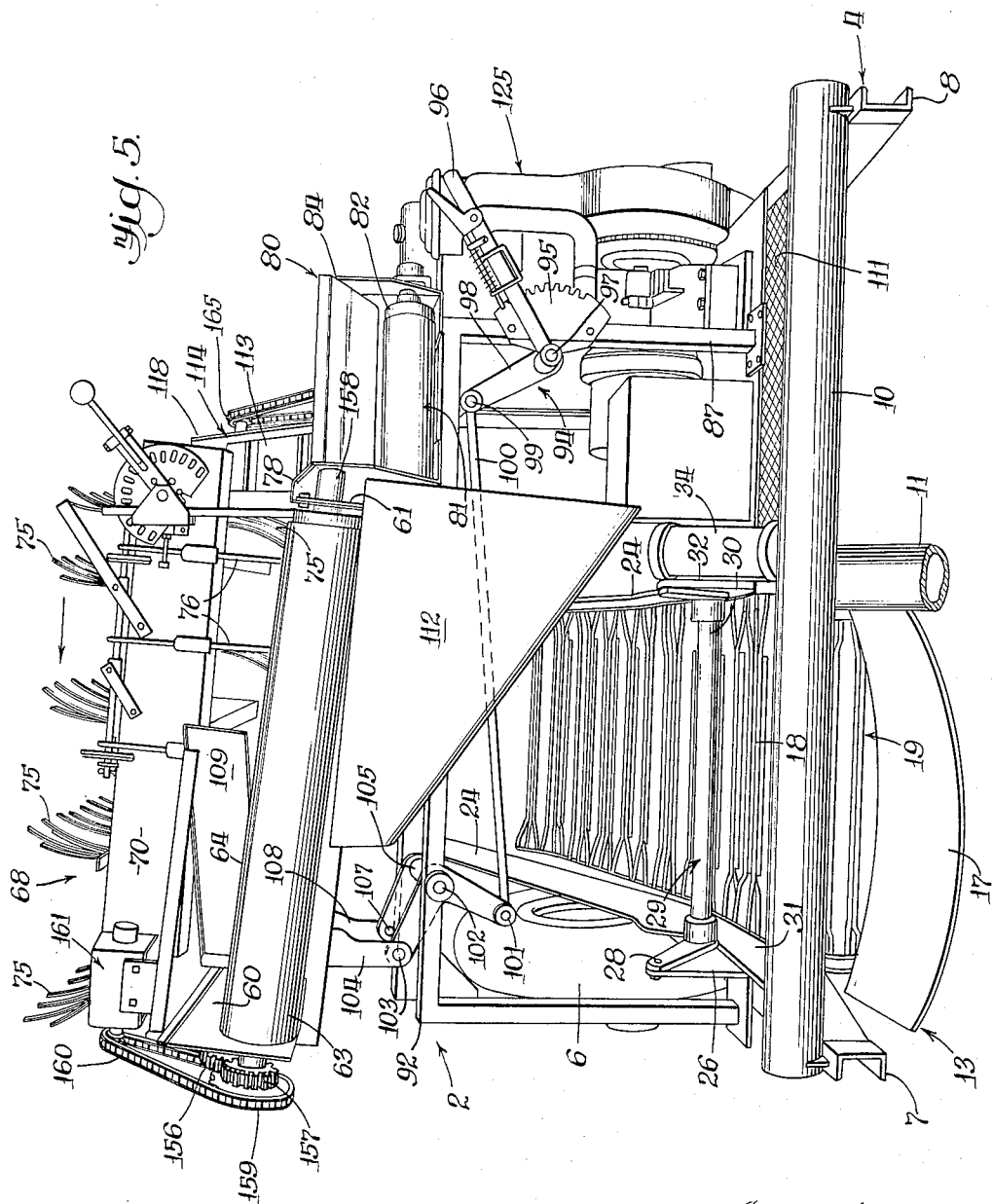

United States Patent Office 2,726,501
Patented Dec. 13, 1955

2,726,501

POTATO HARVESTER AND SEPARATOR

Russell R. Raney, Western Springs, Victor J. Komuchar, Brookfield, John E. Gammie, Chicago, and Robert C. Evans, La Grange, Ill., assignors to International Harvester Company, a corporation of New Jersey Application December 2, 1952, Serial No. 323,535

4 Claims. (Cl. 55—51)

This invention relates to potato harvesters and more particularly to a novel machine which is adapted to harvest the potatoes and then sort the potatoes from the aggregate and also remove the haulm.

A general object of the invention is to provide a compact unit wherein the parts are arranged in an efficient manner in order to provide a relatively narrow machine designed to achieve maneuverability in the field and ease of transport from place to place.

A further object of the invention is to design a potato harvester incorporating serially arranged transporting devices and wherein each transporting device is formed and arranged to perform a processing function on the aggregate whereby the potatoes are continuously being separated from the debris and finally delivered at the last station substantially free of dirt, stones and the like.

Another object of the invention is to design a potato harvesting apparatus requiring minimum manual labor and wherein manual operation is necessary to locate the operator in a strategic location whereat he may perform several operations.

These and other objects of the invention will become apparent from the specification and the drawings, wherein:

Figure 5 is a front view of the novel potato harvester.

Figure 1:
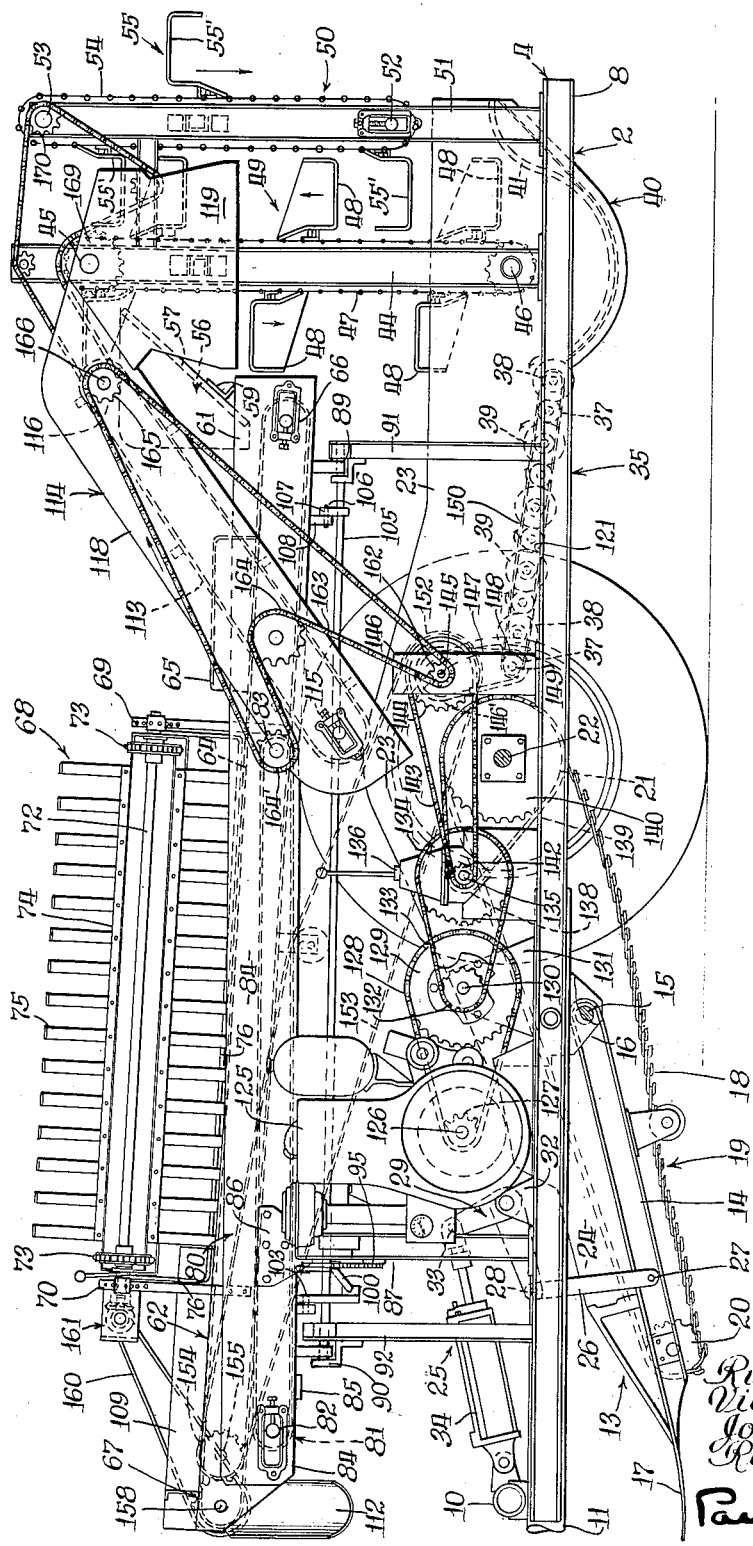
Figure 1 is a side elevational view of the novel potato harvester.

Describing the invention in detail, the potato harvester generally designated 2 comprises a wheeled framework 4 including an intermediate axled cross-beam 5 with wheels 6, 6 journaled to opposite ends thereof, the member 5 being joined to longitudinal side beam members 7 and 8 extending fore and aft thereof and interconnected at their forward and rear extremities by front and rear cross-beams 9 and 10. The frame 4 also comprises a central main beam member 11 preferably at its forward part constituted in the form of a tube and extending from the cross-member 9 to which it is joined at its rear end and beneath the member 10 and projecting forwardly thereof to provide the usual hitching attachment to an associated motivating vehicle such as a tractor as will be readily understood by those skilled in the art. The beam 10 may be interconnected with the beam 8 by means of a series of cross-brace members 12, 12.

The frame 4 supports a digger conveyor assembly 13 at one side thereof between the main beam member 11 and the side member 7, the assembly 13 comprising a longitudinal side beam or board 14 at each side pivoted at its upper rear end on a cross-shaft 15 carried from depending brackets 16 on the members 7 and 11, the forward ends of the beams 14 being connected to the respective lateral edges of a digger blade or scoop plow 17 which at its rear edge discharges onto a top run or stretch 18 of a shaker chain 19 which at its lower forward extremity is trained about a sprocketed idler roll 20 extending between and journaled from the side members 14 adjacent to their forward ends. The upper rear end of the shaker conveyor chain 19 is trained about a sprocketed shaft assembly 21, the shaft 22 of which is journaled from bearings in upstanding side panels 23 carried by the members 7 and 11, the panels 23 receiving the rear extremities of upstanding side panels or boards 24, 24 which flank the opposite sides or lateral edges of the conveyor chain 19 atop the members 14.

The conveyor assembly 13 is movable vertically to lowered operating position or to raised transport position by an operating linkage generally designated 25 and comprising a pair of upright link members 26, 26 disposed at opposite sides of the assembly 13 each link member pivoted at its lower end as at 27 to the adjacent side beam 14 of the conveyor assembly 13 and at its upper end pivoted as at 28 to a forwardly extending arm of a bell-crank assembly 29, the assembly 29 incorporating a rock shaft 30 pivoted adjacent to its opposite ends from brackets 31 and 32 connected to the members 7 and 11 respectively. The other arm of the bell-crank assembly 29 extends diagonally forwardly upwardly from one end of shaft 30 and is pivotally connected as at 33 to one end of a hydraulic motor 34 which at its opposite end is pivoted to the forward cross-beam member 10. It will be appreciated that the flexibility of the conveyor chain permits the forward portion of the assembly 13 to pivot about the shaft 15 to raised or lowered position.

The discharge end of the conveyor assembly 13, that is the upper rear extremity of the top run 18 of the conveyor chain 19 discharges onto a downwardly rearwardly inclined combined conveyor and haulm removing mechanism generally designated 35 which at its forward end is disposed in stepped down relationship to said rear extremity of conveyor assembly 13, said mechanism comprising rearward extensions of the side panels 23 which commence alongside the upper rear part of the conveyor assembly 13 and continue to the rear end of the machine. The assembly 35 is constituted of a plurality of haulm removing conveyor elements comprising a series of transverse side-by-side laterally spaced rolls 37, 38, the rolls 37 being preferably of cylindrical contour and alternated with the rolls 38 which are also preferably cylindrical and carry a series of counter-rotating discs 39 driven by the rolls 37 fore and aft thereof in grasping relationship to the haulm as the potatoes are rolled downwardly rearwardly, the said rolls 37 and 38 all rotating in the direction shown by the arrow. The rear extremity of the assembly 35 discharges into a transverse trough 40 comprising a series of laterally spaced bars 41 which permit the dirt to sift out therethrough, the bars 41 being carried from the panels 23.

A pair of upright stanchions 44 are supported at their lower ends from the members 7 and 11 at opposite ends of the trough 40 and mount adjacent to their upper and lower ends sprocketed cross-shafts 45 and 46 about which are trained endless chains 47 carrying transverse bucket assemblies 48 constituted of a series of laterally spaced tynes or bars 48' closed at opposite ends to provide containers. The buckets 48 are adapted to orbit about horizontal axes in a general vertical plane and are adapted to move in the direction of the arrows as shown in Figure 1, that is, downwardly with the tynes 48' thereof in interdigitating relationship with the bars 41 of the trough 40 and in scooping relationship to the aggregate being delivered into the trough 40 from the conveyor assembly 35. The buckets 48 descend on the forward side of the bucket elevator conveyor generally designated 49 and ascend on the rear side of said conveyor 49 at a predetermined rate of speed.

Rearwardly of the elevator conveyor assembly 49, a clod removing conveyor mechanism generally indicated 50 is mounted from the beam members 7 and 11 and comprises a pair of upright stanchions 51, 51 connected at their lower ends to the beam members 7 and 11, the stanchions 51 rotatably mounting adjacent to their lower and upper ends sprocketed crossrollers 52 and 53 about which are trained endless chains 54 to which are connected a series of bucket assemblies 55 constituted of a series of widely spaced fingers 55' adapted to interdigitate with the fingers of the buckets 48, the fingers of the buckets 48 being relatively closely spaced.

It will be noted that the buckets 55 are arranged to ascend with the buckets 48 along adjacent runs and the assembly 50 is so timed that the buckets 55 thereof will overtake the next preceding bucket 48 as it travels upwardly along the rear side of the assembly 49 so that the buckets 50 rake out large clods. It will be noted that the buckets 55 pass over the top of the assembly 50 around the sprocketed roller assembly 53 and empty behind or have a discharge rearwardly of the machine.

The buckets 48 moving upwardly on the backside of the assembly 49 swing over the top of the sprocket roll 45 and empty onto a downwardly forwardly extending chute structure 56 comprising a series of laterally spaced bars 57 arranged in interdigitating relationship to the bars 48' of the bucket assemblies 48, which pass therethrough.

Figure 2:
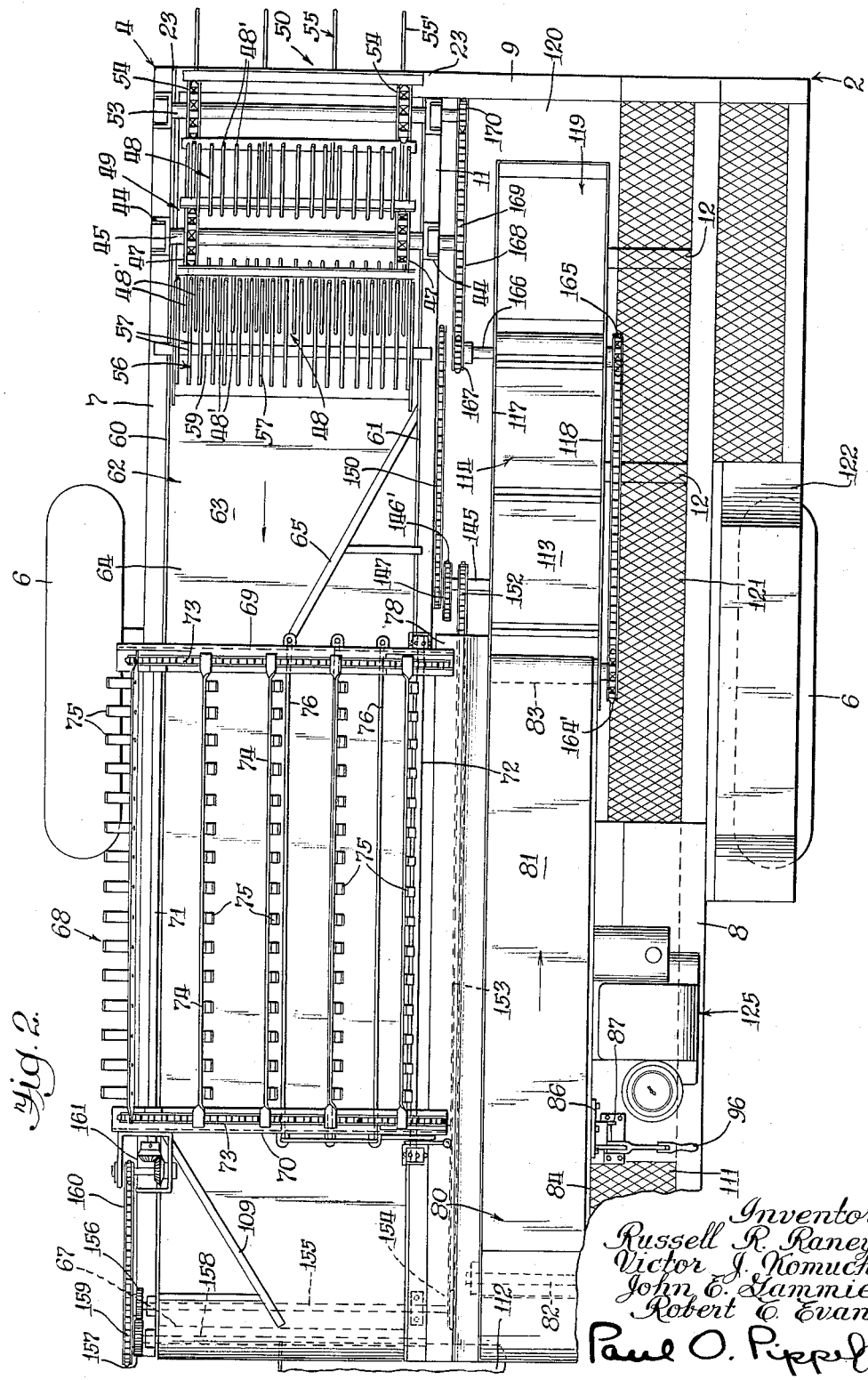
Figure 2 is a plan view thereof.

The bars 57 are interconnected by cross-member 59, which, at opposite ends is connected to a pair of upstanding shield members or boards 60, 61 disposed at opposite ends or along the lateral edges of a conveyor table generally designated 62, said conveyor table comprising an endless apron 63 with a top run 64 disposed at its rear end in receiving relationship to the discharge from the chute assembly 56 and moving forwardly in the direction of the arrow as shown in Figure 2. The panel 61 is provided with a baffle 65 which extends upwardly from the top run of the apron and is angled from the chute 56 in converging relationship with respect to the shield 60 in a direction toward the discharge end of the conveyor 62 in order to funnel the potatoes and the remaining aggregate to the right edge (that is looking from the rear of the machine toward the front).

The apron 63 passes around rollers 66 and 67 carried at opposite ends of the panels and frame members 60 and 61 and the movement of the top run 64 of the apron carries the potatoes and remaining aggregate under a separator indicated generally 68.

The separator comprises a framework including spaced end frames 69 and 70 carried by members 60, 61 and extending transversely of the conveyor 62 and spaced longitudinally thereof and supporting adjacent to each edge of the apron 63 sprocketed shafts 71 and 72 about which are trained endless chains 73, 73 interconnected by transverse slats 74, 74, the slats 74 carrying a series of flexible flays 75, 75 formed of tire carcass or other yieldable material of such nature as will not bruise the potatoes.

The frames 69 and 70 also carry a series of laterally spaced hurdles 76, 76 adjacent to the discharge extremity of the separator and over which the potatoes are adapted to be swept while stopping stones and other similar objects. The flays sweep pursuant to the orbiting of the chain 73, 73 in a direction as shown by the arrow in Figure 5 whereat a sweeping action is obtained from the outboard edge of the top run 64 of the conveyor 62 to the inboard edge thereof over the series of hurdles and the potatoes are discharged onto an inclined paneling 78 in alignment with the separator 68 transversely of the apron 62, the paneling 78 being part of the inboard edge of a trough of a collecting conveyor generally designated 80, said conveyor 80 comprising an endless apron 81 moving rearwardly in the direction of the arrow as indicated in Figure 2 and trained over front and rear rolls 82 and 83, the rolls 82 and 83 being supported and extending transversely between the paneling 78 and an upstanding outboard paneling 84, the paneling 84 and 78 being suitably interconnected by bottom cross-members and carried by means of brackets 86 (Figs. 1 and 2) connected to the paneling 84 and 78 from suitable frame members 87 supported from the beam members 12 spanning the space between the main frame members 8 and 11.

The sorting table 62 is disposed in superposed relationship to conveyors 13 and 35 and pivotally mounted at its inboard edge by depending brackets pivotally supported as at 89 and 90 (Fig. 1) from longitudinally spaced frames 91 and 92 therebeneath, the frames 91 and 92 being suitably carried from the main beams 7 and 11 of the underframe structure. The sorting table is tiltable up and down about the pivots 89 and 90 at its outboard edge by means of a manually operable actuating linkage generally designated 94 (Fig. 5) and comprising a quadrant 95 carried by a frame member 87 with detent means cooperable with a lock on an operating lever 96 which is pivoted as at 97 to the quadrant, the lever being provided with an arm 98 pivoted as at 99 to a rod 100, the opposite end of the rod being pivoted as at 101 to one end of a bell-crank which is pivoted at 102 to the frame 92, the opposite end of the bell-crank being pivoted as at 103 to a depending bracket 104 connected to a cross-brace beneath and part of the apron conveyor 62. The point 102 takes the form of a rock shaft 105 extending through a suitable aperture in the frame 92 and extending beneath the conveyor 62 to adjacent the opposite rear end thereof whereat the rod 105 is connected to an arm 106 which is pivoted at 107 to a depending ear 108 on a bottom cross-member of the table 62.

The rearwardly moving conveyor 80 extends forwardly of the separator 68 alongside the forward portion of the conveyor table 62, which forward portion is provided with a baffle 109 extending from the separator and angled from the outboard edge of the table 62 toward its inboard edge in the forward direction of the conveyor. This baffle 109 is mounted on the plate 60 carried by the framing of the conveyor 62 along its outboard edge and the baffle 109 functions to funnel the material being moved out from under the separator 68 toward the inboard edge of the top run 64 of the table 62 within easy reach of an operator who may be stationed on a platform 111 disposed at the left forward corner of the machine and carried by the members 8, 11 and 12. It will be seen from a consideration of Figures 2 and 5 that the lever 96 is disposed conveniently to the station 111. The function of the operator at station 111 is to pick out any potatoes from the aggregate which has passed out from under the separator 68 and to deposit these potatoes into the conveyor 80. The remaining aggregate drops off the forward end of the conveyor apron 63 into a chute 112 carried by the framework of table 62, which is angled downwardly to the left of the machine to deposit the debris in between the rows.

The conveyor 81 discharges rearwardly onto the bottom end of the top run 113 of a diagonally upwardly rearwardly inclined elevator conveyor generally designated 114 and suitably carried on rolls 115 and 116 between a pair of upstanding shields 117 and 118, the panel portions 117, 118 at their upper rear ends forming the sides of a bagging chute 119 whereat the potatoes may be discharged into bags which may be carried on a platform 120 beneath the bagging chute, the platform 120 overlying and supported from the adjacent beam members 12, 8 and 11.

An operator's platform 121 is disposed alongside the left extremity or edge of the conveyors 80 and 114 and carried by the frame members 12, 12 inboardly of the left wheel 6 which may be provided with a fender structure or shielding 122 also connected to the adjacent portions of the framework.

The lower edges of the side panels 117 and 118 of the elevator 114 may be supported from suitable framework 123 (Fig. 3) mounted upon adjacent members of the main frame 4.

Figure 3:
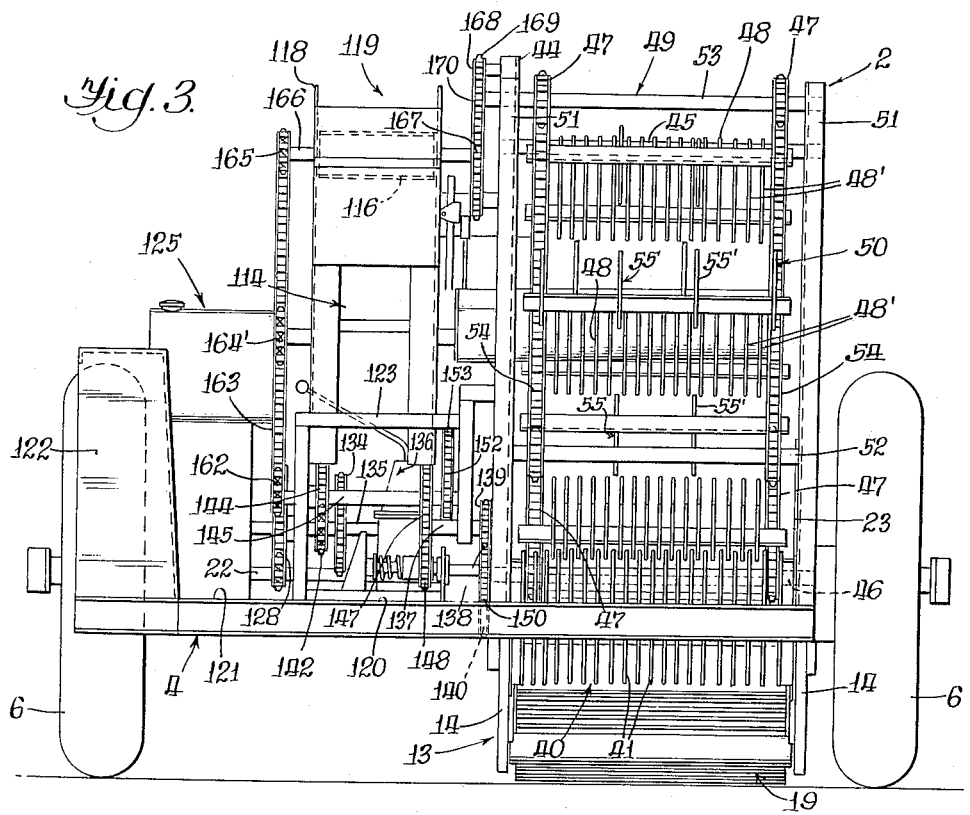
Figure 3 is a rear view thereof.
Figure 4:
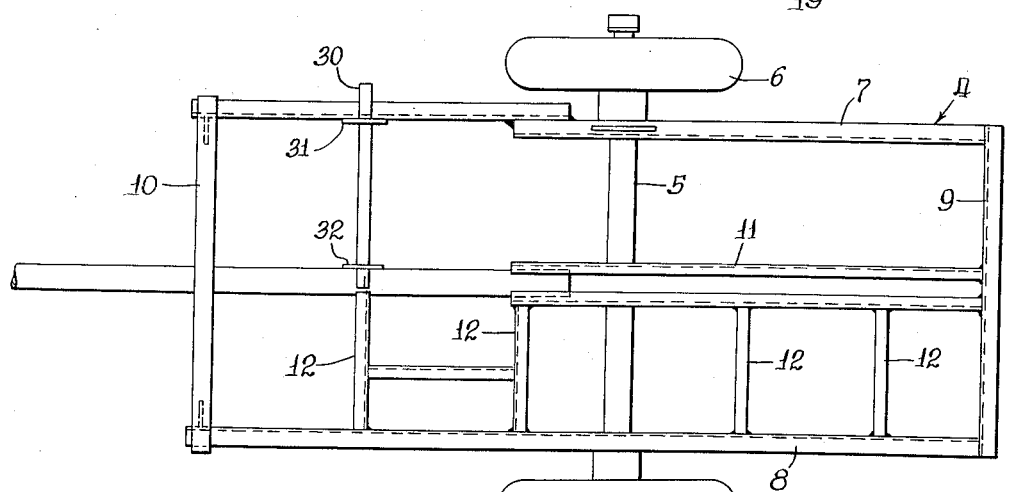
Figure 4 is a plan view on a reduced scale of the supporting framework.

It will be noted that the two level superposed conveyor structure as best seen in Figures 3 and 5 affords a relatively narrow machine with unusual accessibility not only for repair but also adapts the operation by the operator in standing position in view of the elevation of the sorting table 62 as well as of the conveyors 80 and 114.

The drive for the various components of the machine may be in the form of an internal combustion engine generally indicated 125 mounted on a platform carried on members 8, 11 and 12, the engine having an output shaft 126 with a sprocket 127 driving a chain 128 which is trained about a sprocket 129 carried on a jack-shaft 130 which is rotatably mounted from a suitable bracket structure 131 carried by the frame 4. The shaft 130 is keyed to a sprocket 132 which drives a chain 133 driving a sprocket 134 keyed to an input shaft 135 of a variable speed transmission mechanism 136. The output shaft 137 (Figure 3) of the transmission mechanism 136 is provided with a sprocket 138 which drives a chain 139 driving a sprocket 140 keyed to the shaft 22 of the shaker chain conveyor 19. It will be realized that the transmission 136 is adapted to control the speed of the shaker chain conveyor at the will of the operator in conformance with the ground traverse of the potato harvester over the field terrain.

The input shaft 135 of the transmission mechanism 136 also has a sprocket 142 keyed thereto driving a chain 143 which drives a sprocket 144 keyed to a power divider jack-shaft 145 which is suitably mounted on a frame 146 carried by the frame 4. The jack-shaft 145 is keyed to a sprocket 146' which drives a chain 147 which is trained about and drives a sprocket 148 keyed to a shaft 149 of one of the rolls 37 of the vine removing conveyor 35, the rolls 37 and 38 of the conveyor 35 being interconnected by a chain and sprocket arrangement 150 and thereby being all driven in the same direction.

The jack-shaft 145 also has a sprocket 152 keyed thereto which drives a chain 153, the chain 153 extends generally medially of the machine beneath the wall portion 78 of conveyor 80 (Fig. 2) and drives a sprocket 154 keyed to a jack-shaft 155 which is supported beneath the table 62 from the framework thereof, the jack-shaft 155 having a gear 156 keyed thereto which meshes with a gear 157 (see Fig. 2) which is connected to a shaft 158 of the roll 67 for driving the apron 64 of said table conveyor 62.

The shaft 158 is keyed to a sprocket 159 which drives a chain 160 which through a gear train 161 carried on the frame 70 drives the shaft 71 of the separator whereby providing drive to the sweepers.

Referring again to Figure 1, the centrally disposed power divider jack-shaft 145 also has a sprocket 162 keyed thereto which drives a chain 163 trained about an idler 164 carried by the side panel 118 of the elevator conveyor 114 and then the chain is wrapped around a sprocket 164' keyed to a shaft of the roll 83 of the rearwardly delivering collection conveyor 80 which receives from the separator, the chain 163 also being trained about and meshing with a sprocket 165 of the upper driving roll 116 of the elevator bagging conveyor 114, the sprocket 165 being keyed to a shaft 166 (Figures 1, 2 and 3) which is keyed to sprocket 167 driving a chain 169' trained about sprockets 169 and 170 keyed respectively to the sprocketed roll assemblies 46 and 53 of the elevator conveyor 49 and decloding mechanism 50 respectively. The sequence of the drives is apparent in order to obtain movement of the conveying and decloding components in the proper directions.

It will be appreciated that the machine heretofore described is a narrow, compact unit and has been tested in the field and found to have excellent maneuverability as well as good balance inasmuch as the operators are positioned at one side of the machine in counterbalancing relationship to the processing machine components and the operators stations together with the components are located between the wheels.

What is claimed is:

1. A traveling potato harvester comprising a frame including an intermediate axle member with wheels thereon at opposite sides of the frame, a digger and shaker chain type conveyor unit carried by the frame and extending diagonally upwardly rearwardly longitudinally of the frame and having a rear end terminating over said axle member, combination conveying and haulm removing means carried by the frame in longitudinal alignment with said conveyor unit and having one end disposed adjacent to said axle member in receiving relationship to said rear end of said unit and extending diagonally downwardly therefrom, a generally upright elevator and clod removing assembly carried by the frame and having a lower end disposed in receiving relationship to the opposite end of said combination means and extending upwardly therefrom, a forwardly moving apron conveyor carried by the frame in superposed relationship to said unit and said first mentioned means and substantially coextensive therewith longitudinally of the harvester and having a rear end disposed in receiving relationship to the upper end of said elevator conveyor, sorting means associated with said apron conveyor for delivering the potatoes from the aggregate carried by the apron laterally across the apron and discharge the potatoes off one edge thereof, rearward delivery conveying means positioned alongside and receiving from said edge of the apron and carried upon a medial portion of the frame and extending longitudinally thereof, and receiving means carried by the frame at the rear end of the harvester alongside said elevating and clod removing means and disposed in receiving relationship to said rearward delivery conveying means.

2. The invention according to claim 1 and further characterized in that said clod removing assembly comprises an endless conveyor including means formed and arranged to rake through material carried by said elevator and having a discharge rearwardly of said harvester.

3. The invention according to claim 1 and further characterized in that said sorting means is disposed intermediate the ends of said apron conveyor and in vertical alignment therewith.

4. The invention according to claim 1 and further characterized in that said combination conveying and haulm removing means is disposed at said one end thereof in stepped down relationship to said rear end of said shaker conveyor unit.

References Cited in the file of this patent

UNITED STATES PATENTS

| | | |
|---|---|---|
| 2,015,549 | Dwyer et al. | Sept. 24, 1935 |
| 2,464,305 | Greaves | Mar. 15, 1949 |
| 2,532,314 | Johnson | Dec. 5, 1950 |
| 2,277,450 | Parr | Mar. 24, 1952 |